Patented Jan. 19, 1932

1,841,997

UNITED STATES PATENT OFFICE

KLAUS WEINAND, OF COLOGNE-FLITTARD, GERMANY, ASSIGNOR TO GENERAL ANILINE WORKS, INC., OF NEW YORK, N. Y., A CORPORATION OF DELAWARE

1-AMINOANTHRAQUINONE-2-SULPHONIC ACID

No Drawing. Application filed April 10, 1928, Serial No. 269,035, and in Germany April 23, 1927.

The present invention relates to the production of 1-aminoanthraquinone-2-sulphonic acid.

I have found that 1-aminoanthraquinone-2-sulphonic acid can easily be prepared by sulphonating 1-aminoanthraquinone by means of fuming sulfuric acid in the presence of an alkali metal or alkali earth metal sulfate. As sulphonating agent I prefer fuming sulfuric acid containing about 10–20% $SO_3$, whereby the temperature at which reaction takes place varies between about 100–120° C. depending on the strength of the fuming sulfuric acid used.

When working in this manner substantially pure 1-amino-anthraquinone-2-sulphonic acid is obtained. By adding alkali-, or earth alkali-, metal sulfates, one avoids the simultaneous oxidation and formation of by-products such as 1-amino-anthraquinone-2.4-disulphonic acid, which otherwise always take place.

The following example illustrates my invention without limiting it thereto, the parts being by weight:

*Example*: 48 parts of 1-amino-anthraquinone and 48 parts of anhydrous sodium sulfate are introduced in 1850 parts of sulfuric acid monohydrate and 550 parts of fuming sulfuric acid, containing 65% $SO_3$, are added to this solution at 60–70° C. in the course of one hour. The temperature is then raised to 120° C., the melt is maintained at this temperature until a sample is soluble in hot water, then cooled to 30° C. and stirred into 6000 parts of water. The 1-amino-anthraquinone-2-sulphonic acid thereupon crystallizes out in the form of its sodium salt.

I claim:

1. Process, which comprises in sulphonating 1-aminoanthraquinone with fuming sulfuric acid in the presence of a compound of the group consisting of alkali metal sulfates and alkali earth metal sulfates.

2. Process, which comprises sulphonating 1-aminoanthraquinone by means of fuming sulfuric acid containing about 10–20% $SO_3$ at a temperature between about 100° C. and about 120° C. in the presence of an alkali metal sulfate.

3. Process, which comprises sulphonating 1-aminoanthraquinone by means of fuming sulfuric acid containing about 10–20% $SO_3$ at a temperature between about 100° C. and about 120° C. in the presence of a compound of the group consisting of sodium sulfate and potassium sulfate.

4. Process which comprises introducing 48 parts by weight of 1-amino-anthraquinone and 48 parts by weight of anhydrous sodium sulfate in 1850 parts by weight of sulfuric acid monohydrate, adding 550 parts by weight of fuming sulfuric acid containing 65% $SO_3$ at a temperature of 60–70° within one hour, heating the mixture to 120° C. until a sample is soluble in hot water and precipitating the sodium salt of the 1-amino-anthraquinone-2-sulphonic acid by means of 6000 parts by weight of water.

In testimony whereof I have hereunto set my hand.

KLAUS WEINAND.